United States Patent
Zhou

(10) Patent No.: US 10,663,997 B2
(45) Date of Patent: May 26, 2020

(54) ELECTRONIC DEVICE CIRCUIT BOARD

(71) Applicant: Shannon Systems Ltd., Shanghai (CN)

(72) Inventor: Shuhua Zhou, Shanghai (CN)

(73) Assignee: SHANNON SYSTEMS LTD., Shanghai (CN)

( * ) Notice: Subject to any disclaimer, the term of this patent is extended or adjusted under 35 U.S.C. 154(b) by 0 days.

(21) Appl. No.: 16/503,568

(22) Filed: Jul. 4, 2019

(65) Prior Publication Data

US 2020/0125125 A1 Apr. 23, 2020

(30) Foreign Application Priority Data

Oct. 17, 2018 (CN) .......................... 2018 1 1205803

(51) Int. Cl.
*G05F 1/575* (2006.01)
*H02M 3/156* (2006.01)

(52) U.S. Cl.
CPC ............ *G05F 1/575* (2013.01); *H02M 3/156* (2013.01)

(58) Field of Classification Search
CPC . G05F 1/56; G05F 1/565; G05F 1/575; G05F 1/577; H02M 3/155; H02M 3/156
See application file for complete search history.

(56) References Cited

U.S. PATENT DOCUMENTS

| | | | | |
|---|---|---|---|---|
| 7,859,131 B2* | 12/2010 | Xu | ......................... | H02M 3/156 307/11 |
| 2008/0111807 A1* | 5/2008 | Yan | .................... | H02M 3/33561 345/211 |
| 2010/0109563 A1* | 5/2010 | Gong | ................. | H05B 33/0827 315/294 |
| 2013/0049716 A1* | 2/2013 | Saeki | .................... | H02M 3/156 323/271 |
| 2014/0055115 A1* | 2/2014 | Raval | .................... | H02M 3/156 323/288 |

* cited by examiner

*Primary Examiner* — Matthew V Nguyen
(74) *Attorney, Agent, or Firm* — McClure, Qualey, & Rodack, LLP

(57) ABSTRACT

Voltage regulation techniques for providing stable power to the components mounted on an electronic device circuit board are presented. In addition to a first component and a second component, a voltage converter and a power line are provided on the electronic device circuit board. The voltage converter converts an external voltage to an internal voltage that is conveyed through the power line. The first component is coupled to the power line to get power via a first power supply point on the power line. The second component is coupled to the power line to get power via a second power supply point on the power line. A first feedback terminal is provided on the power line between the first power supply terminal and the second power supply terminal. The voltage converter regulates the internal voltage based on a voltage value retrieved from the first feedback terminal.

15 Claims, 2 Drawing Sheets

ELECTRONIC DEVICE CIRCUIT BOARD

CROSS REFERENCE TO RELATED APPLICATIONS

This Application claims priority of China Patent Application No. 201811205803.5, filed on Oct. 17, 2018, the entirety of which is incorporated by reference herein.

BACKGROUND OF THE INVENTION

Field of the Invention

The present invention relates in general to an electronic device circuit board, and in particular it relates to voltage regulation technology used in a circuit board.

Description of the Related Art

There are generally several components soldered onto an electronic device circuit board. The components may be a controller, a flash memory, a dynamic random access memory (DRAM), or the like. In order to power these components, at least one voltage converter (e.g., a DC-DC converter) can be soldered onto the board. The external power coupled to the circuit board is stepped down by the voltage converter to power the various components on the circuit board.

How to provide stable power voltage to the components on an electronic device circuit board is an important issue in this technical field.

BRIEF SUMMARY OF THE INVENTION

In the present invention, a design for an electronic device circuit board is shown. The feedback for a power converter to perform voltage regulation is retrieved from the component side.

An electronic device circuit board in accordance with an exemplary embodiment of the disclosure includes a voltage converter, a power line, a first component, and a second component. The voltage converter converts an external voltage to an internal voltage to be conveyed by the power line. The first component is coupled to the power line to get power from a first power supply point on the power line. The second component is coupled to the power line to get power from a second power supply point on the power line. The power line provides a first feedback point that is located between the first power supply point and the second power supply point. The voltage converter regulates the internal voltage based on a voltage value retrieved from the first feedback point.

There may be a first voltage dividing circuit provided on the electronic device circuit board. The first voltage dividing circuit divides the voltage value retrieved from the first feedback point and uses a first voltage dividing point to output a divided voltage to the voltage converter.

There may be a second voltage dividing circuit provided on the electronic device circuit board. The second voltage dividing circuit divides a voltage value retrieved from an output terminal of the voltage converter and uses a second voltage dividing point to output a divided voltage to the voltage converter and thereby the voltage converter further takes the voltage value at the output terminal of the voltage converter into consideration when regulating the internal voltage. The voltage converter is connected to the power line via the output terminal.

In an exemplary embodiment, the first voltage dividing point is connected to the second voltage dividing point.

In an exemplary embodiment, the first voltage dividing circuit includes a first resistor and a second resistor. The first resistor is coupled between the first feedback point and the first voltage dividing point, and the second resistor couples the first voltage dividing point to ground. The second voltage dividing circuit includes a third resistor and a fourth resistor. The third resistor is coupled between the output terminal of the voltage converter and the second voltage dividing point, and the fourth resistor couples the second voltage dividing point to ground.

In an exemplary embodiment, the resistance of the first resistor and the second resistor is lower than the resistance of the third resistor and the fourth resistor.

In an exemplary embodiment, the resistance ratio of the first resistor to the second resistor is equal to the resistance ratio of the third resistor to the fourth resistor.

There may be a third component provided on the electronic device circuit board. The third component is coupled to the power line to get power from a third power supply point on the power line. The power line provides a second feedback point that is located between the second power supply point and the third power supply point. The voltage converter further takes a voltage value retrieved from the second feedback point into consideration when regulating the internal voltage. In comparison with the first feedback point, the second feedback point may be further away from the output terminal of the voltage converter.

There may be a third voltage dividing circuit provided on the electronic device circuit board. The third voltage dividing circuit divides a voltage value retrieved from the second feedback point and uses a third voltage dividing point to output a divided voltage to the voltage converter. The third voltage dividing point may be connected to the first voltage dividing point, and the first voltage dividing point may be connected to the second voltage dividing point.

The third voltage dividing circuit may include a fifth resistor and a sixth resistor. The fifth resistor is coupled between the second feedback point and the third voltage dividing point, and the sixth resistor couples the third voltage dividing point to ground.

The resistance of the fifth resistor and the sixth resistor may be lower than the resistance of the first resistor and the second resistor. The resistance of the first resistor and the second resistor may be lower than the resistance of the third resistor and the fourth resistor.

In an exemplary embodiment, the resistance ratio of the first resistor to the second resistor is equal to the resistance ratio of the third resistor to the fourth resistor, and is further equal to the resistance ratio of the fifth resistor to the sixth resistor.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

There are generally several components soldered onto an electronic device circuit board. The components may be a controller, a flash memory, a dynamic random access memory (DRAM), and the like. In order to power these components, at least one voltage converter (e.g., a DC-DC converter) is soldered to the board. The external power coupled to the circuit board is stepped down by the voltage converter to power the various components on the circuit board. The conventional technology simply couples an output terminal of the voltage converter back to the voltage converter for voltage regulation. In the present invention, the feedback for the voltage converter to perform voltage regulation is retrieved from the component side.

Figure 1:
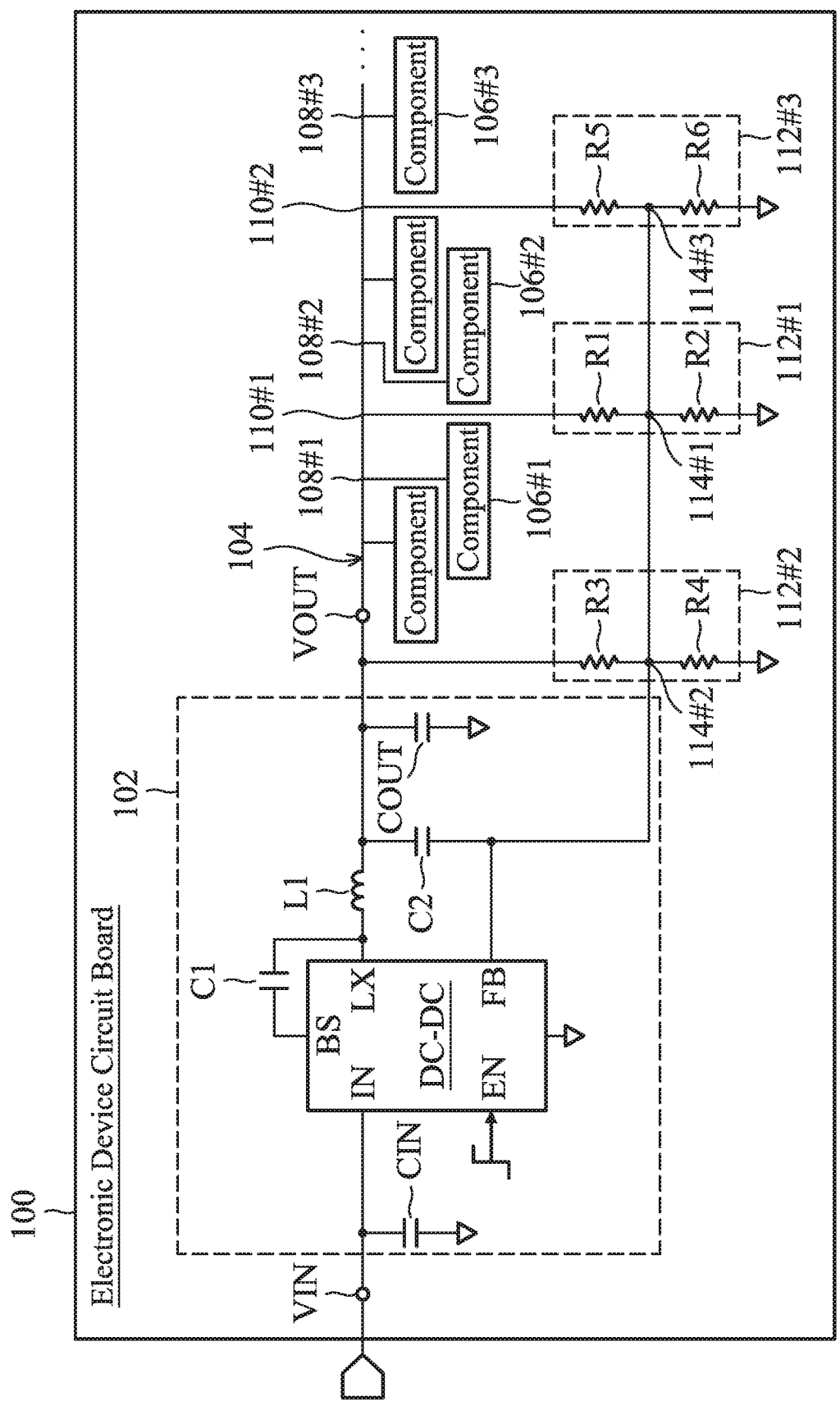
FIG. 1 illustrates an electronic device circuit board 100 in accordance with an exemplary embodiment of the disclosure.

FIG. 1 illustrates an electronic device circuit board 100 in accordance with an exemplary embodiment of the disclosure. There are several components soldered onto the electronic device circuit board 100 and a voltage converter 102 is provided on the electronic device circuit board 100. In this exemplary embodiment, the voltage converter 102 is implemented by a DC-DC converter. An external voltage VIN is coupled to the electronic device circuit board 100 and converted into an internal voltage VOUT by the voltage converter 102 to power the components on the electronic device circuit board 100. A power line 104 is arranged on the electronic device circuit board 100. The output terminal (VOUT) of the voltage converter 102 is coupled to the power line 104. The components on the electronic device circuit board 100 are coupled to the power line 104 for power. In the exemplary embodiment of FIG. 1, the power conditions of components 106#1, 106#2, and 106#3 are discussed. How the voltage converter 102 performs voltage regulation based on feedback from the component side is discussed.

The component 106#1 is coupled to the power line 104. As shown, the component 106#1 gets power from a power supply point 108#1 on the power line 104. The component 106#2 is coupled to the power line 104 to get power from a power supply point 108#2 on the power line 104. The component 106#3 is coupled to the power line 104 to get power from a power supply point 108#3 on the power line 104. There are feedback points 110#1 and 110#2 on the power line 104. The feedback point 110#1 is located between the power supply points 108#1 and 108#2. The feedback point 110#2 is located between the power supply points 108#2 and 108#3. The feedback point 110#2 is further away from the output terminal VOUT of the voltage converter 102 than the feedback point 110#1. The voltage converter 102 regulates the output voltage VOUT based on feedback from the feedback points 110#1 and 110#2. Note that the feedback points 110#1 and 110#2 belong to the component side. The feedback from the feedback points 110#1 and 110#2 is different from that immediately retrieved from the output terminal (VOUT) of the voltage converter 102. Along the power line 104, the power drains to the component 106#1 before being conveyed to the feedback point 110#1, and further drains to the component 106#2 before being conveyed to the feedback point 110#2. Signals from the feedback points 110#1 and 110#2 reflect how the power attenuates along the power line 104 and, accordingly, the voltage converter 102 accurately regulates and outputs the voltage VOUT. The voltage ripple on the power line 104 is successfully depressed. By retrieving the feedback from the feedback point 110#1, the power supplied to the component 106#2 through the power line 104 is more stable. Similarly, stable power is supplied to the component 106#3 due to the feedback retrieved from the feedback point 110#2.

In addition to considering the feedback retrieved from the feedback points 110#1 and 110#2, the voltage regulation of the voltage converter 102 is further based on the feedback retrieved from the output terminal (VOUT) of the voltage converter 102. At the output terminal (VOUT) of the voltage converter 102, the power has not been drained to any component. A stable power supply for the component 106#1, therefore, is guaranteed.

The power attenuation that may occur along the power line 104 is fully considered according to the illustrated exemplary embodiment. The feedback retrieving depends on the user's need. For example, the feedback retrieving from the feedback point 110#2 and the feedback retrieving from the output terminal VOUT of the voltage converter 102 may be optional. In another exemplary embodiment, more feedback points at the component side are provided signals along the power line 104.

In this paragraph, the feedback architecture shown in FIG. 1 is discussed in detail. The electronic device circuit board 100 further includes voltage dividing circuits 112#1, 112#2, and 112#3. The voltage dividing circuit 112#1 divides the voltage value of the feedback point 110#1 and outputs, via a voltage dividing point 114#1, the divided voltage to the voltage converter 102. The voltage dividing circuit 112#2 divides the voltage value VOUT of the output terminal of the voltage converter 102, and outputs, via a voltage dividing point 114#2, the divided voltage to the voltage converter 102. The voltage dividing circuit 112#3 divides the voltage value of the feedback point 110#2 and outputs, via a voltage dividing point 114#3, the divided voltage to the voltage converter 102. The voltage dividing points 114#1, 114#2, and 114#3 may be joined together. Because one single feedback terminal FB is required, the chip DC-DC of the voltage converter 102 does not need to change its design.

A voltage dividing circuit (112#1, 112#2 or 112#3) may be realized by resistors connected in series. The voltage dividing circuit 112#1 includes resistors R1 and R2. The resistor R1 is coupled between the feedback point 110#1 and the voltage dividing point 114#1. The resistor R2 couples the voltage dividing point 114#1 to the ground. The voltage dividing circuit 112#2 includes resistors R3 and R4. The resistor R3 is coupled between the output terminal VOUT of the voltage converter 102 and the voltage dividing point 114#2. The resistor R4 couples the voltage dividing point 114#2 to the ground. The voltage dividing circuit 112#3 includes resistors R5 and R6. The resistor R5 is coupled between the feedback point 110#2 and the voltage dividing point 114#3. The resistor R6 couples the voltage dividing point 114#3 to the ground.

In an exemplary embodiment wherein the voltage dividing points 114#1, 114#2, and 114#3 are connected together, the resistance ratio (R1/R2) of the resistor R1 to the resistor R2 may be equal to the resistance ratio (R3/R4) of the resistor R3 to the resistor R4, and may be equal to the resistance ratio (R5/R6) of the resistance R5 to the resistance R6.

In an exemplary embodiment, the resistors R1, R3, and R5 are set to the same resistance, and the resistors R2, R4, and R6 are set to the same resistance. In the architecture, feedbacks from different feedback points are balanced. The power conditions along the whole power line 104 are taken into consideration with the same weighting.

In an exemplary embodiment, the resistance of resistors R5 and R6 are lower than the resistance of resistors R1 and R2, and the resistance of resistors R1 and R2 are lower than the resistance of resistors R3 and R4. This architecture provides a weighted feedback design. According to the weighted feedback design, the feedback weight of the feedback point 110#2 is higher than the feedback weight of the feedback point 110#1, and the feedback weight of the feedback point 110#1 is higher than the feedback weight of the output terminal VOUT of the voltage converter 102. The feedback point 108#3 with the severest power consumption loss is assigned with the highest weight. In an exemplary embodiment, the resistors R5 and R6 may have a 10% to 20% resistance difference in comparison with the resistance of the resistors R1 and R2, and the resistors R1 and R2 may have a 10% to 20% g resistance difference in comparison with the resistance of the resistors R3 and R4.

This paragraph further describes the detailed design of the voltage converter 102. In addition to an input pin IN receiving the input voltage VIN and a feedback pin FB receiving the feedback, the chip DC-DC has other input pins EN, BS, and LX. An input capacitor CIN and an output capacitor COUT are provided with respect to the input and output voltages VIN and VOUT. A capacitor C1 is coupled between the pins BS and LX. The pin LX is further coupled to one end of an inductor L1 to form the output voltage VOUT at the other end of the inductor L1. A fast response capacitor C2 is coupled between the output terminal VOUT and the feedback terminal FB. The chip DC-DC of the voltage converter 102 and the peripheral circuit around the chip DC-DC may be implemented by other designs and are not limited thereto.

Figure 2:
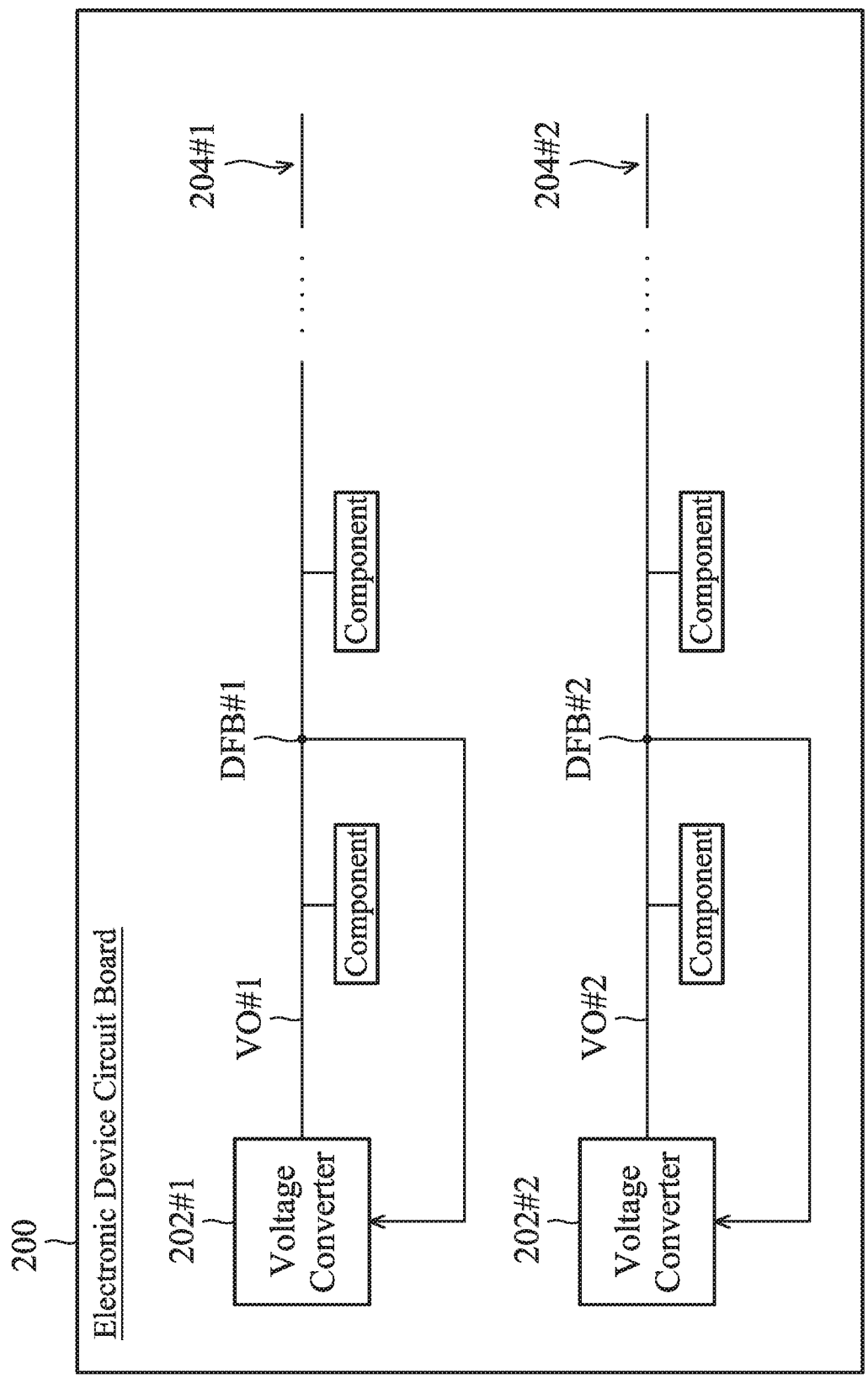
FIG. 2 illustrates another electronic device circuit board 200 in accordance with an exemplary embodiment of the present invention.

FIG. 2 illustrates another electronic device circuit board 200 in accordance with an exemplary embodiment of the present invention. The components on the electronic device circuit board 200 may correspond to different power requirements. As shown, there are voltage converters 202#1 and 202#2 on the electronic device circuit board 200. Regulated voltages VO #1 and VO #2 are supplied to the power lines 204#1 and 204#2, respectively. According to the feedback concept of the present invention, the voltage converter 202#1 retrieves feedback from the feedback point DFB #1 for regulation of the output voltage VO #1. The feedback point DFB #1 is located at the component side where the power (VO #1) has been supplied to at least one component. Similarly, the voltage converter 202#2 retrieves feedback from the feedback point DFB #2 for regulation of the output voltage VO #2. The feedback point DFB #2 is located at the component side where the power (VO #2) has been supplied to at least one component. Even if the traces of the power lines 204#1 and 204#2 on the electronic device circuit board 200 are complex, the voltages VO #1 and VO #2 are still stably supplied.

The electronic device circuit board of the present invention may be applied to various electronic devices. A voltage converter that performs voltage regulation based on feedback from the component side should be considered belong to the scope of the present invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device circuit board, comprising:
    a voltage converter and a power line, wherein the voltage converter converts an external voltage to an internal voltage to be conveyed by the power line;
    a first component, coupled to the power line to get power from a first power supply point on the power line; and
    a second component, coupled to the power line to get power from a second power supply point on the power line,
    wherein:
    the power line provides a first feedback point that is located between the first power supply point and the second power supply point; and
    the voltage converter regulates the internal voltage based on a voltage value retrieved from the first feedback point.

2. The electronic device circuit board as claimed in claim 1, further comprising:
    a first voltage dividing circuit, dividing the voltage value retrieved from the first feedback point and using a first voltage dividing point to output a divided voltage to the voltage converter.

3. The electronic device circuit board as claimed in claim 2, further comprising:
    a second voltage dividing circuit, dividing a voltage value retrieved from an output terminal of the voltage converter and using a second voltage dividing point to output a divided voltage to the voltage converter and thereby the voltage converter further takes the voltage value at the output terminal of the voltage converter into consideration when regulating the internal voltage,
    wherein the voltage converter is connected to the power line via the output terminal.

4. The electronic device circuit board as claimed in claim 3, wherein:
    the first voltage dividing point is connected to the second voltage dividing point.

5. The electronic device circuit board as claimed in claim 4, wherein:
    the first voltage dividing circuit includes a first resistor and a second resistor, wherein the first resistor is coupled between the first feedback point and the first voltage dividing point, and the second resistor couples the first voltage dividing point to ground; and
    the second voltage dividing circuit includes a third resistor and a fourth resistor, wherein the third resistor is coupled between the output terminal of the voltage converter and the second voltage dividing point, and the fourth resistor couples the second voltage dividing point to ground.

6. The electronic device circuit board as claimed in claim 5, wherein:
    resistance of the first resistor and the second resistor is lower than resistance of the third resistor and the fourth resistor.

7. The electronic device circuit board as claimed in claim 5, wherein:

a resistance ratio of the first resistor to the second resistor is equal to a resistance ratio of the third resistor to the fourth resistor.

8. The electronic device circuit board as claimed in claim 3, further comprising:
a third component, coupled to the power line to get power from a third power supply point on the power line; and
wherein:
the power line provides a second feedback point that is located between the second power supply point and the third power supply point; and
the voltage converter further takes a voltage value retrieved from the second feedback point into consideration when regulating the internal voltage.

9. The electronic device circuit board as claimed in claim 8, wherein:
in comparison with the first feedback point, the second feedback point is further away from the output terminal of the voltage converter.

10. The electronic device circuit board as claimed in claim 9, further comprising:
a third voltage dividing circuit, dividing a voltage value retrieved from the second feedback point and using a third voltage dividing point to output a divided voltage to the voltage converter.

11. The electronic device circuit board as claimed in claim 10, wherein:
the third voltage dividing point is connected to the first voltage dividing point, and the first voltage dividing point is connected to the second voltage dividing point.

12. The electronic device circuit board as claimed in claim 11, wherein:

the first voltage dividing circuit includes a first resistor and a second resistor, wherein the first resistor is coupled between the first feedback point and the first voltage dividing point, and the second resistor couples the first voltage dividing point to ground; and
the second voltage dividing circuit includes a third resistor and a fourth resistor, wherein the third resistor is coupled between the output terminal of the voltage converter and the second voltage dividing point, and the fourth resistor couples the second voltage dividing point to ground; and
the third voltage dividing circuit includes a fifth resistor and a sixth resistor, wherein the fifth resistor is coupled between the second feedback point and the third voltage dividing point, and the sixth resistor couples the third voltage dividing point to ground.

13. The electronic device circuit board as claimed in claim 12, wherein:
resistance of the fifth resistor and the sixth resistor is lower than the resistance of the first resistor and the second resistor.

14. The electronic device circuit board as claimed in claim 13, wherein:
the resistance of the first resistor and the second resistor is lower than the resistance of the third resistor and the fourth resistor.

15. The electronic device circuit board as claimed in claim 12, wherein:
a resistance ratio of the first resistor to the second resistor is equal to the resistance ratio of the third resistor to the fourth resistor, and is further equal to a resistance ratio of the fifth resistor to the sixth resistor.

\* \* \* \* \*